US008443222B1

(12) United States Patent  (10) Patent No.: US 8,443,222 B1
Niimura  (45) Date of Patent: May 14, 2013

(54) VBUS EVENT BASED USB ANALYSIS

(75) Inventor: Aki Niimura, Sunnyvale, CA (US)

(73) Assignee: Total Phase, Inc., Sunnyvale, CA (US)

( * ) Notice: Subject to any disclaimer, the term of this patent is extended or adjusted under 35 U.S.C. 154(b) by 308 days.

(21) Appl. No.: 12/909,758

(22) Filed: Oct. 21, 2010

(51) Int. Cl.
G06F 1/00 (2006.01)
G06F 3/00 (2006.01)

(52) U.S. Cl.
USPC .............................. 713/340; 710/15; 710/18

(58) Field of Classification Search .................... 710/15, 710/18; 713/340
See application file for complete search history.

(56) References Cited

U.S. PATENT DOCUMENTS

| | | | | |
|---|---|---|---|---|
| 5,649,129 | A * | 7/1997 | Kowert | 710/305 |
| 6,850,852 | B1 * | 2/2005 | Ferguson et al. | 702/67 |
| 7,127,649 | B2 * | 10/2006 | Leaming | 714/715 |
| 8,095,698 | B2 * | 1/2012 | Santhanam et al. | 710/15 |
| 8,176,216 | B1 * | 5/2012 | Santhanam et al. | 710/15 |
| 2007/0266183 | A1 * | 11/2007 | Lanning | 710/1 |
| 2012/0054376 | A1 * | 3/2012 | Vaynberg et al. | 710/18 |

OTHER PUBLICATIONS

Total Phase—"Beagle Protocol Analyzers—Data Sheet v3.06"; 96 pages, Dated Aug. 28, 2009.*
Hitex Development Tools—"USB Agent Explores the secrets of USB"; 2 pages, Dated Jun. 2001.*
LeCroy—"Conquest Series USB Protocol Analyzer/Exerciser"; 22 pages, Dated 2008.*
LeCroy—"Conquest Series USB Protocol Analyzers"; 12 pages, Dated 2008.*
Computer Access Technology Corporation—"CATC USB Chief Bus & Protocol Analyzer User's Manual—for USB Chief Software Version 1.3, Manual Version 1.7"; 133 pages, Dated Nov. 9, 2001.*
LeCroy Adds Integrated Power Analysis to the Voyager Analyzer Platform for USB 2.0 and 3.0, LeCroy Corporation, 2009: http://www.usb.org/press/USBVoyager_PowerTrkr_072109.pdf.
Tektronix: Digital Storage Oscilloscopes, May 1, 1998: http://direct.www2.tek.com/cmswpt/psdetails.lotr?ct=PS&cs=psu&ci=14412&lc=EN.

* cited by examiner

Primary Examiner — Brian Misiura
(74) Attorney, Agent, or Firm — Van Pelt, Yi & James LLP (57) ABSTRACT

VBUS or other power event based USB analysis is disclosed. Occurrence of a power related event on a monitored bus, such as an inrush current event, is detected. In some embodiments, a rate at which a power related data is sampled at the hardware protocol analyzer is change automatically in response to the power related event being detected. In some embodiments, a capture of a stream of data packets observed on the monitored bus is triggering automatically in response to the power related event being detected.

27 Claims, 9 Drawing Sheets

VBUS EVENT BASED USB ANALYSIS

BACKGROUND OF THE INVENTION

The Universal Serial Bus (USB) is a commonly used technology to connect peripheral devices to a host machine, such as a computer. In addition to data lines used to transfer data, the USB connectors and cables include power connections, e.g., the VBUS voltage supply and GND ground lines/pins, available to be used to power USB devices using power supplied by the host.

The USB specification and the characteristics of USB device and host design may impose requirements and/or other limitations with respect to USB power connections. For example, the USB specification requires that to be certified USB compliant a device must pass a series of tests, one of which is the "inrush" current test. Inrush current is the short transient current that occurs at startup or other transitions, for example when you first plug in a USB powered device or when a component uses a lot of power during a transition other than first plug in (e.g., USB hard disk drive or "HDD" disk wind up to read or write after an idle period).

USB analyzers are used by manufacturers and other developers of USB devices, software (e.g., drivers), firmware, etc. to monitor and analyze communications on the Universal Serial Bus (USB) and to monitor power usage. For example, communications between a target USB devices and a target host to which the device has been connected via a USB port on the target host may be monitored to ensure the device is communicating properly with the target host and vice versa in accordance with applicable USB standards and protocols. Current and voltage on the VBUS line may be monitored to ensure the device passes the inrush current test and meets design or other requirements.

A hardware USB analyzer typically comprises a stand alone or other hardware device having a first set of connectors to enable the analyzer to be connected so as to be able to observe traffic between a target USB device and a target host; hardware and/or firmware to decode signals observed on the USB connection being monitored into USB packets; and hardware, logic, and/or an external connector to enable the analyzer to be connected to an analysis PC and to forward to the analysis PC traffic observed on a monitored bus.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

USB power supply (VBUS) event based analysis is disclosed. In some embodiments, an event, such as an inrush current or other event, is detected. The VBUS or other power line is monitored, for example, and the current is differentiated over time. If the result exceeds an inrush current detection threshold, then a responsive processing is performed. Examples include changing from a low sampling rate to a higher sampling rate with respect to power connection related data observations, such as voltage and current, and trigger USB data capture based on detection of the inrush or other power related event.

Figure 1:
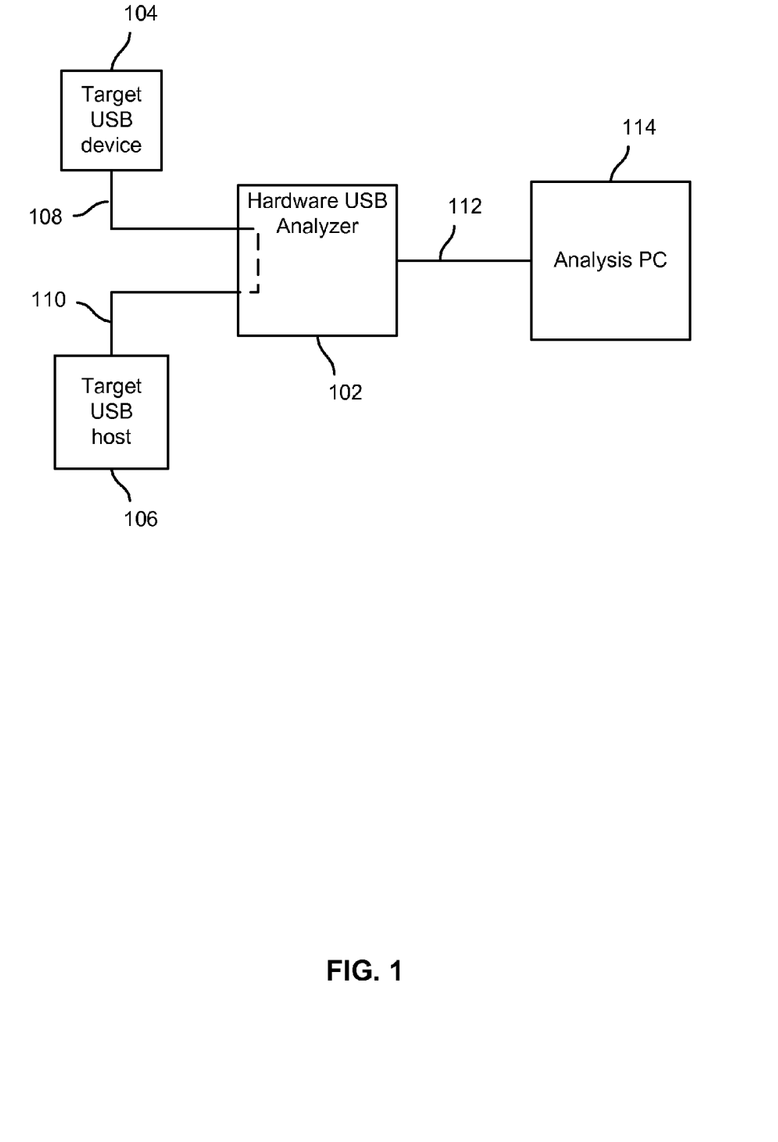
FIG. 1 is a block diagram illustrating an embodiment of a hardware USB analyzer.

FIG. 1 is a block diagram illustrating an embodiment of a hardware USB analyzer. In the example shown, USB analyzer 102 is configured to monitor a USB connection between a target USB device 104 and a target host 106. A first USB cable/connector 108 connects the target USB device 104 to the analyzer 102; and a second USB cable/connector 110 connects the analyzer 102 to the target host 106. Examples of target USB devices include without limitation a printer, a mass storage device, and a human interface device (HID) such as a mouse or keyboard. Connected in the way shown in FIG. 1, the analyzer 102 receives USB bus signals communicated either by the target USB device to the target host or by the target host to the target device, enable the analyzer to monitor the bidirectional communications. Typically the analyzer is configured to listen non-intrusively, such that the target host and target device believe they have a direct USB connection between them. The monitored USB connection includes both data (e.g., D+ and D−, in the case of USB 2.0) and power supply (e.g., VBUS and GND) lines. The analyzer 102 provides an analysis stream via an analysis stream output connection 112 to an analysis PC (or other computer) 114. In some embodiments the connection 112 is itself a USB connection between the analyzer 102 and the analysis PC 114. In various embodiments, the analysis PC 114 and target host 106 may comprises the same physical system, e.g., a PC to which the device 104 has been connected via the analyzer 102 and connections 108 and 110. The analysis stream may include USB data packets observed on the monitored bus and/or voltage, current, and/or other information observed on or with respect to the VBUS or other power lines of the monitored bus.

Figure 2:
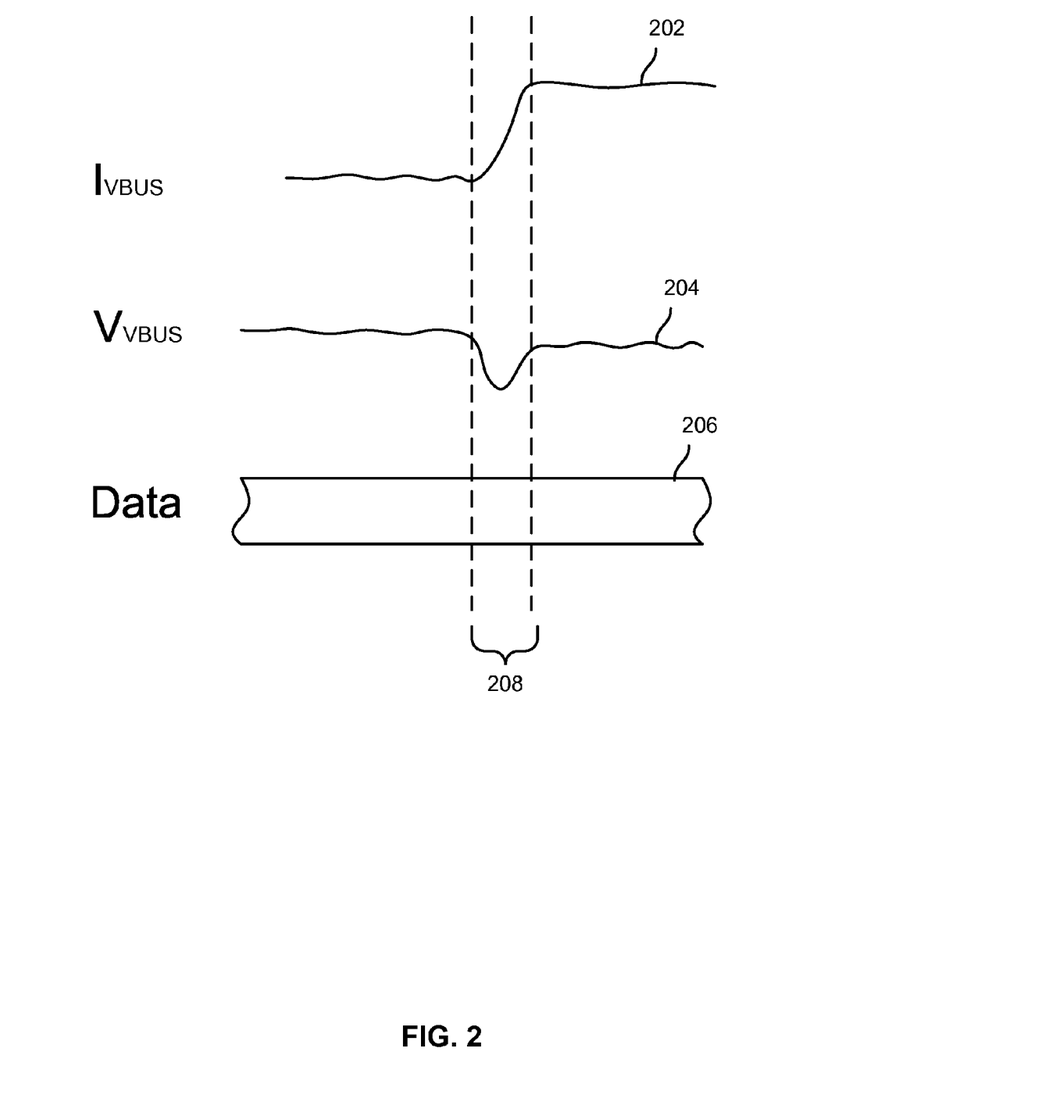
FIG. 2 illustrates an example of an event on the USB power (VBUS) line.

FIG. 2 illustrates an example of an event on the USB power (VBUS) line. In the example shown, the current drawn by the target USB device is represented by VBUS line current trace 202. The VBUS voltage is represented by trace 204. Finally, data packets observed on the monitored bus are represented by the packet stream 206. A power related event window 208 is shown. In this example, an inrush current and an associated drop in VBUS voltage have been detected. A design or other engineer or technician may be interested particularly in the shape of the portions of the current and voltage curves that fall within the event window and relatively much less interested in current and voltage behavior outside that window, when both current and voltage are predictably relatively stable at nominal or other normal levels (e.g., the USB specification specified 5V for the VBUS voltage). Similarly, a user may be interested in observing and analyzing USB data packets communicated during such a power related event, for example to determine the effect if any of the current surge and associate voltage dip on the data communication performance of the target USB device and/or target host.

Techniques disclosed herein facilitate the analysis of power related and USB data communication information in the vicinity of power related events, such as inrush, by triggering higher rate sampling of power related information such as current and voltage and/or capture of USB data communications based at least in part on detection of the power related event. In some embodiments, to conserve resources on a hardware USB analyzer and/or analysis PC and the bandwidth of the communication link between them, a lower sampling rate is used to monitor power related information such as current and voltage during periods of less interest. Upon detection of the power related event of interest, a higher sampling rate is used. In some embodiments the higher sampling rate is used until an end of event is detected, at which point sampling reverts to the lower rate. In some embodiments, USB data capture can be triggered by a power related event such as inrush.

Figure 3:
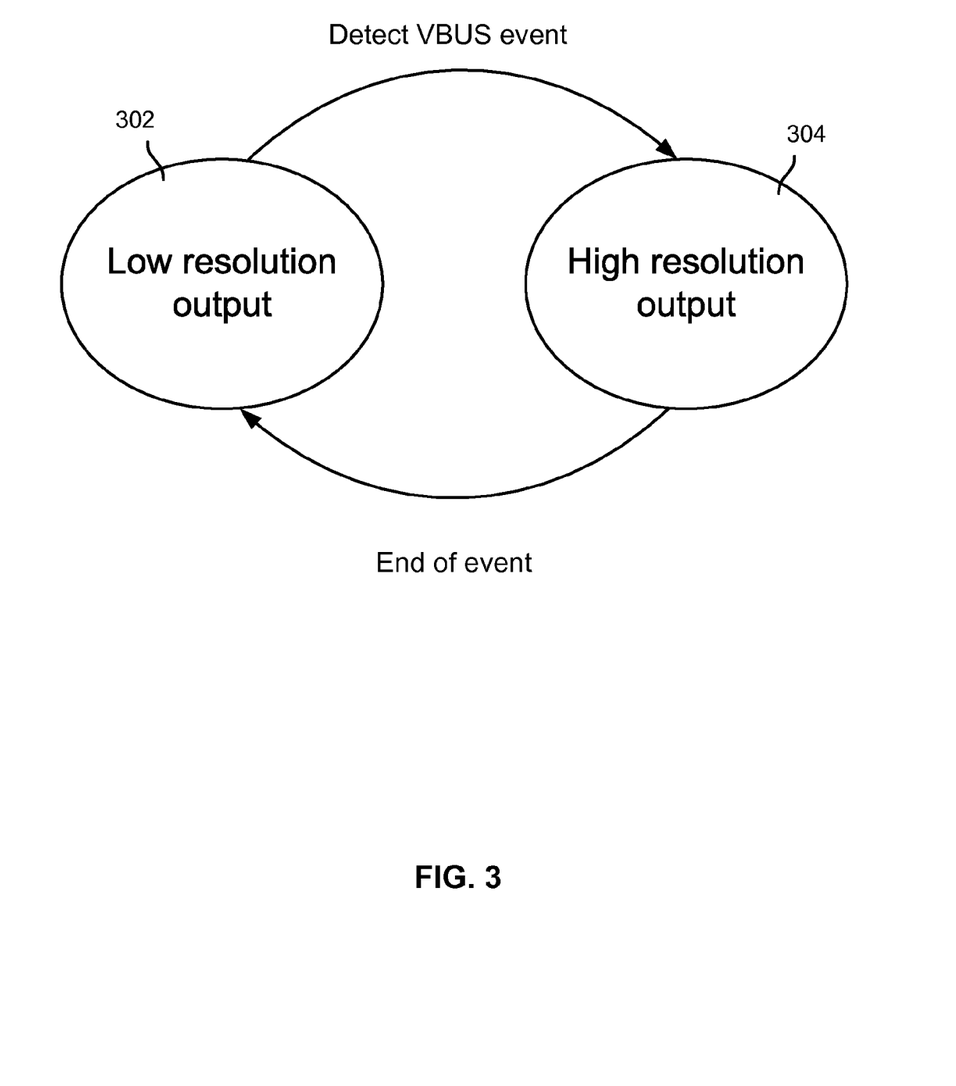
FIG. 3 is a state diagram illustrating an embodiment of a process to monitor USB power related information.

FIG. 3 is a state diagram illustrating an embodiment of a process to monitor USB power related information. In the example shown, a hardware USB analyzer begins sampling power related information, such as VBUS current and voltage, at a low resolution rate 302. Upon detection of a monitored-for power related event, such as inrush current, the analyzer switches automatically to a high resolution sampling rate 304. In the example shown, upon detection of an end of the power related event, the analyzer reverts automatically to the lower resolution output 302. In some embodiments, the analyzer makes observations at the same rate in either mode 302 or 304 but selectively provides samples as output, e.g., for inclusion in an analysis stream sent to an analysis PC, at a lower or higher frequency depending on the mode (e.g., one in ten samples sent in higher resolution mode as compare to one in a hundred sent in lower resolution mode).

Figure 4:
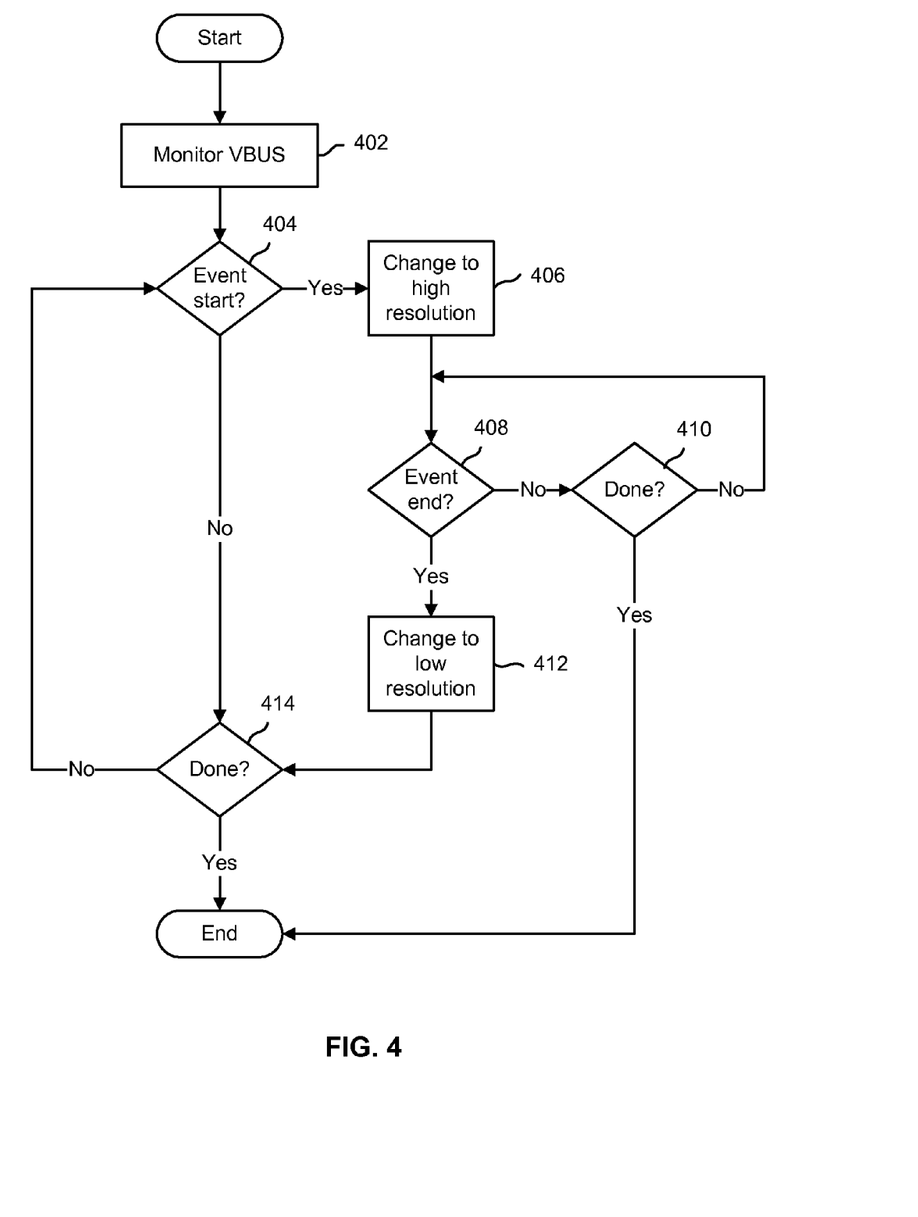
FIG. 4 is a flow diagram illustrating an embodiment of a process to monitor USB power related information.

FIG. 4 is a flow diagram illustrating an embodiment of a process to monitor USB power related information. In various embodiments, the process of FIG. 4 is performed by a hardware USB analyzer to implement the state machine of FIG. 3. In the example shown, the current and voltage on the VBUS line of the monitored bus are monitored (402). If a VBUS event, such as inrush current, or the end of such an event is detected (404), then a sampling rate at which power related information is being sampled is changed to a higher resolution sampling rate (406). If an event end is detected (408) prior to the analyzer being stopped (410), the sampling rate is changed back to the original lower resolution sampling rate (412). The process continues until done (410, 414), e.g., the analyzer is stopped.

In some embodiments, a delay or other component and/or technique is used to ensure that data of interest is sampled at the higher rate on detection of the power related event. In some such embodiments, use of the delay ensures that some monitored data observed just prior to the event being detected will be sampled at the higher rate. In some embodiments, on detection of an end of the event of interest the change to sampling at the lower rate is held for a prescribed period, such as a prescribed number of samples sampled at the higher rate, to ensure that high resolution sampling continues through to the end of monitored data associated with the event, which due to the delay mentioned above may not yet have been sampled at the higher rate at the moment the end of event is detected due to the delay mentioned above.

Figure 5:
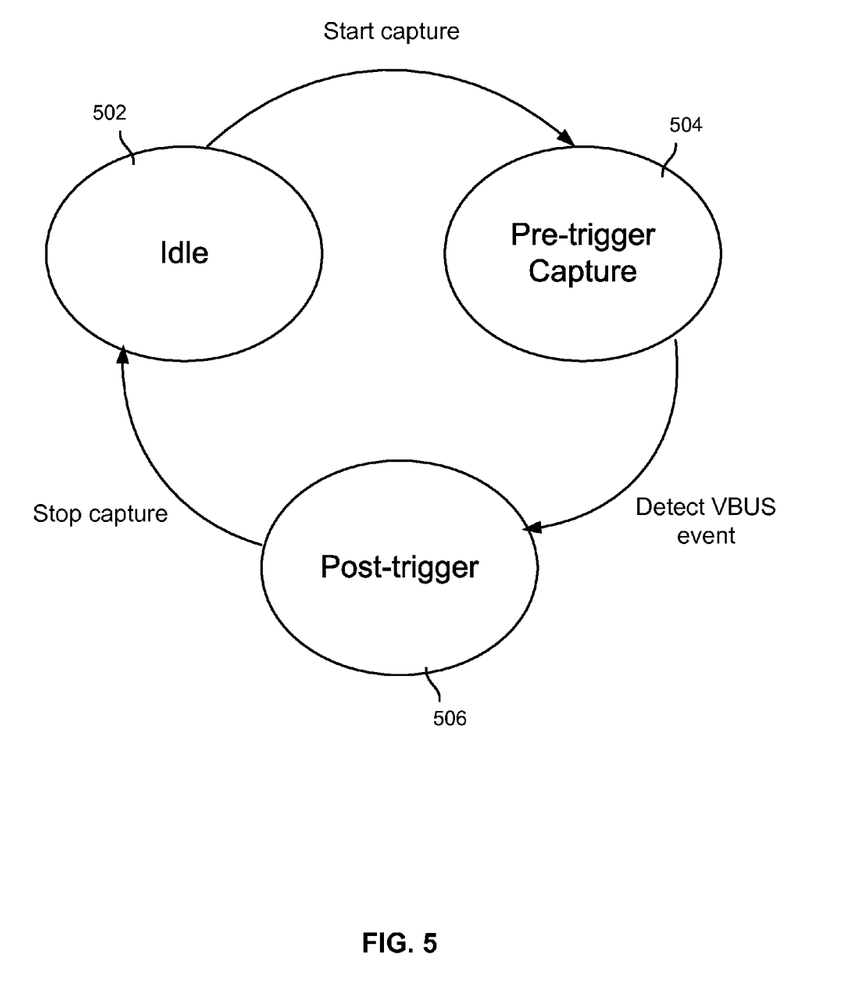
FIG. 5 is a state diagram illustrating an embodiment of a process for analyzing USB data.

FIG. 5 is a state diagram illustrating an embodiment of a process for analyzing USB data. In the example shown, a hardware or other USB analyzer initially is in a non-capture or idle state 502. Upon receiving an indication to start capture the analyzer enters a pre-trigger capture state 504. In some embodiments, in the pre-trigger capture state the USB analyzer receives and buffers packets observed on the monitored bus, but does not (yet) send them to the analysis PC for analysis. Packets are stored in a circular buffer and older packets are overwritten if needed to store more recently received packets. The buffer is of a size sufficient to include in an analysis stream, upon occurrence of a triggering event, a prescribed amount of pre-trigger data observed on the monitored bus. Upon detection of a VBUS or other power related event, such as inrush current and/or a voltage drop, the analyzer transitions to a post-trigger capture state 506. In the post-trigger capture state, pre-trigger data in the circular buffer and a prescribed amount of post-trigger data observed on the monitored bus are sent via a connection to an analysis PC for higher level (e.g., USB transaction and/or USB class level) decoding and display of associated information to a user, e.g., in real time, in a user readable form. Upon detecting an end of the power related event, or in some embodiments, once a prescribed post-trigger amount of information has been captured or another indication to stop capture is received, the analyzer reverts to the idle state 502.

Figure 6:
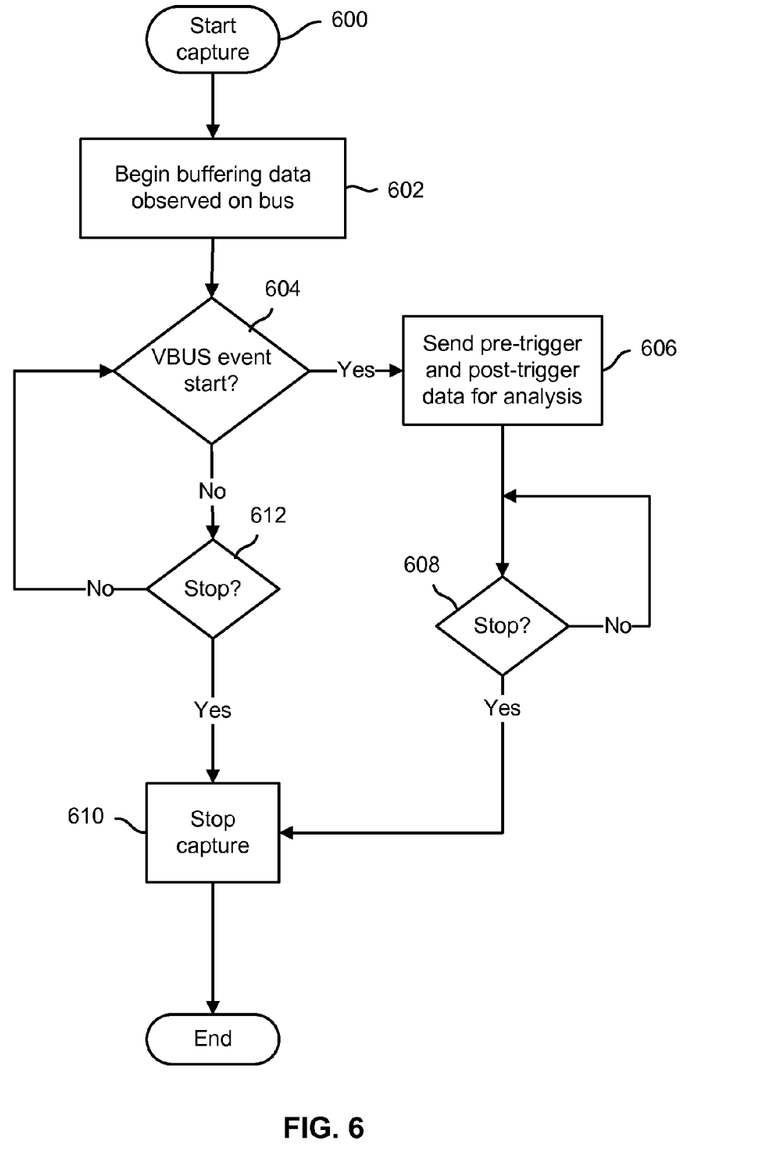
FIG. 6 is a flow diagram illustrating an embodiment of a process for analyzing USB data.

FIG. 6 is a flow diagram illustrating an embodiment of a process for analyzing USB data. In various embodiments, the process of FIG. 6 is performed by a hardware USB analyzer to implement the state machine of FIG. 5. In the example shown, upon receiving an indication to start capture (600) data observed on the monitored bus is buffered in a circular buffer but not sent to the analysis PC for analysis (602). The current and voltage on the VBUS line of the monitored bus are monitored. If a VBUS event, such as inrush current, is detected (604), then the analyzer enters the post-trigger capture state described above, in which pre-trigger and post-trigger data observed on the monitored bus is sent to the analysis PC for analysis (606). The analyzer sends data to the analysis PC until a stop condition is met (608), e.g., a prescribed amount of post-trigger data has been sent or the analyzer has been stopped, at which time the analyzer stops capturing data (610), after which the process ends. The process also ends if, for example, the analyzer is stopped without the trigger condition having been met (612).

Figure 7:
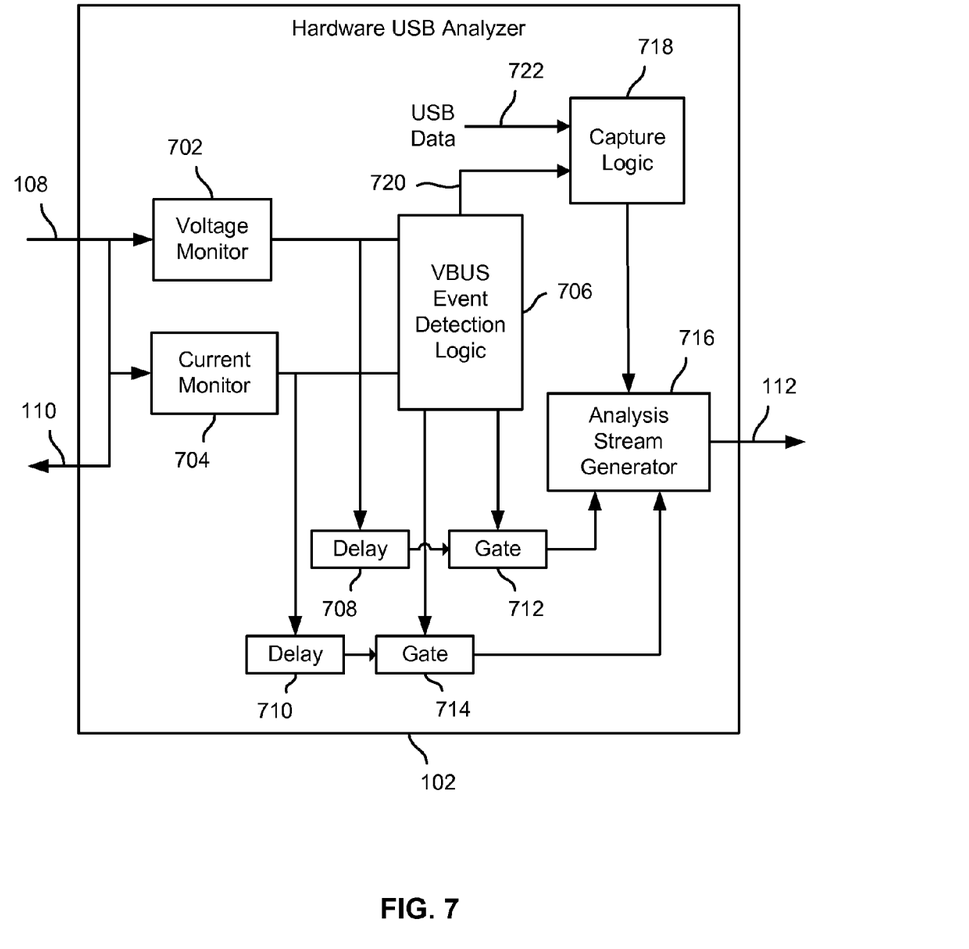
FIG. 7 is a block diagram illustrating an embodiment of a hardware USB analyzer.

FIG. 7 is a block diagram illustrating an embodiment of a hardware USB analyzer. In the example shown, analyzer 102 includes a voltage monitor 702 and a current monitor 704 configured to monitor voltage and current, respectively, on a VBUS or other USB power supply line of a monitored bus. Voltage and current, respectively, are sensed and converted to a digital signal, e.g., by analog-to-digital converters (ADC). The digitized voltage and current values are provided to a VBUS event detection logic 706. In addition, the voltage values are provided via a delay 708 to a gate 712, and the current values are provided via a delay 710 to a gate 714. The gates 712 and 714 are responsive to control signals received from the VBUS event detection logic 706. The detection logic 706 is configured to use the voltage and current levels received from monitors 702 and 704, respectively, to detect power related events, such as inrush. For example, in some embodiments the instantaneous voltage is compared with the average voltage over a recent period and if the difference is greater than a prescribed threshold a detection event is generated. In some embodiments, current is differentiated over time and if the result exceeds a prescribed threshold a detection event is generated. Upon detection of a power related event, the detection logic sends control signals to gates 712 and 714, in this example, to cause them to provide voltage and current samples as output to analysis stream generator 716 at a higher resolution rate, for example, one out of every ten values received, instead of one out of every hundred. In various embodiments, analysis stream generator 716 is configured to packetize the voltage and current sample data and transfer the packets to the analysis PC via connection 112. Upon detection of an end to the event, the detection logic 706 waits until a prescribed number of samples have been sent at the higher resolution rate, to account for the effect of delays 708 and 710, and then sends control signals to gates 712 and 714 to cause them to revert to providing samples as output at the lower resolution rate. In this way, bandwidth on connection 112 and processing power on the analysis PC are conserved, since voltage and current information are transferred at the higher resolution rate only during the period of interest. In some embodiments, the detection logic 706 and/or the analysis stream generator 716 are configured to insert into the analysis stream a token or other data that represents the detection event. In some embodiments, the token is used at the analysis PC to process USB data communications and/or other data in a manner associated with the detection event, as described more fully below in connection with FIG. 9.

Referring further to FIG. 7, in the example shown upon detection of the power related event, such as inrush, the detection logic 706 sends (or can be configured to send) to a capture logic 718, via a connection 720, a signal indicating that the power related event, such as inrush, has been detected. If a user has configured the capture logic 718 to trigger capture upon occurrence of the power related event, then upon receipt of the signal from the detection logic 706 the capture logic 718 initiates capture of USB communications (packets) observed on the monitored bus. In some embodiments, USB packets are received via a connection 722, for example by reading the packets from a circular or other buffer in which they are stored. In the example shown, the packet decoders, buffers, and other elements used to observe USB packets on the monitored bus and make them available for capture and transfer to the analysis PC are not shown. In some embodiments, capture continues until an end of the power related event is detected and reported to the capture logic 718 by detection logic 706. In some embodiments, capture ends once a prescribed amount of post-trigger observed data has been captured and transferred to the analysis PC.

Figure 8:
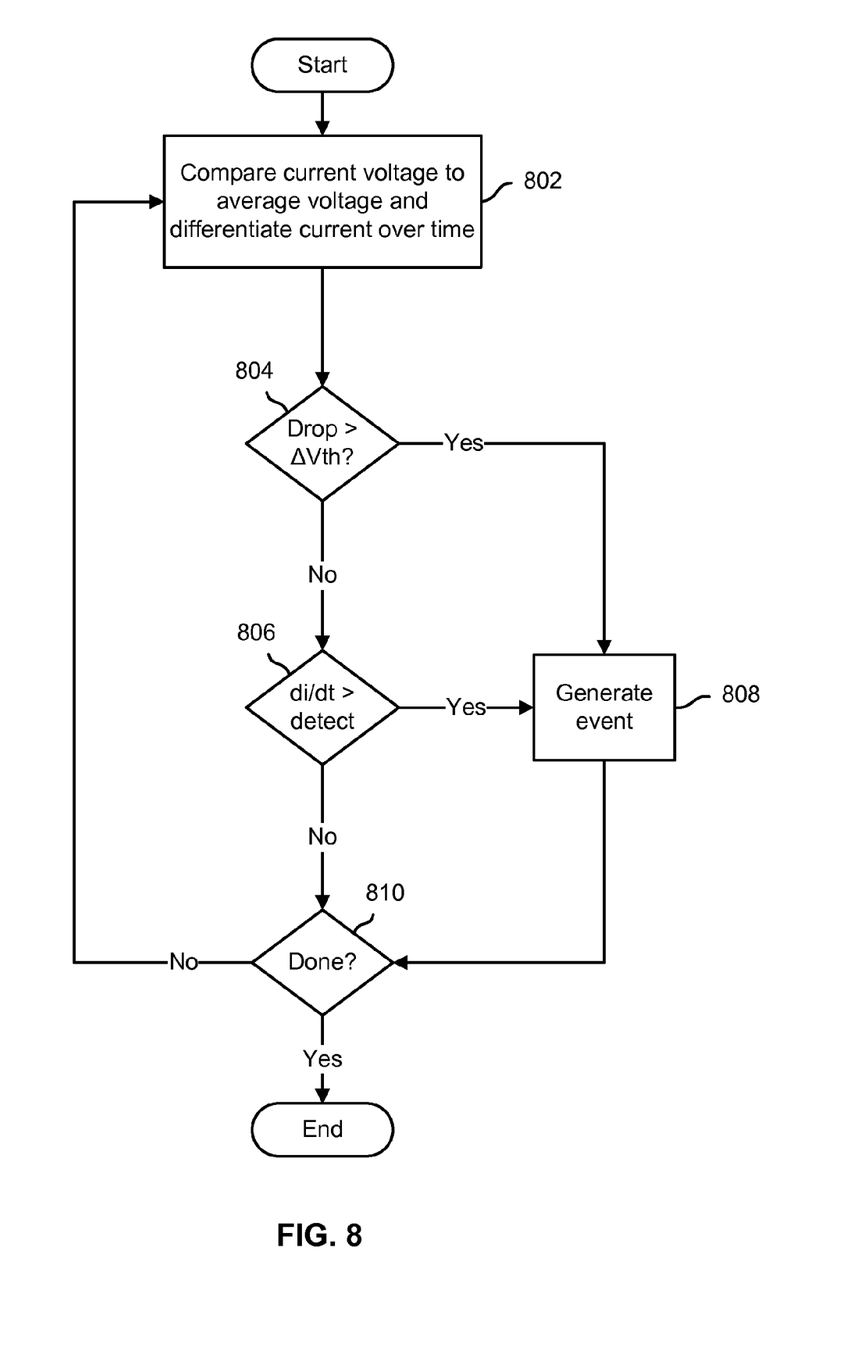
FIG. 8 is a flow diagram illustrating an embodiment of a process for detecting a USB power related event.

FIG. 8 is a flow diagram illustrating an embodiment of a process for detecting a USB power related event. In various embodiments, the process of FIG. 8 is implemented by detection logic such as detection logic 706 of FIG. 7. In the example shown, the voltage observed on the VBUS line is compared to a recent average voltage, and current is differentiated over time (802). If the most recently observed voltage differs from the computed average by more than a prescribed amount (804) or if the result of differentiating the current over time exceeds a detection threshold (806), a detection event is generated (808). While in the example shown in FIG. 8 a single common event is generated if either criterion is met (808), in other embodiments separate detection criterion specific events may be used, e.g., a voltage drop event and an inrush current event. The process of FIG. 8 continues until done (810).

Figure 9:
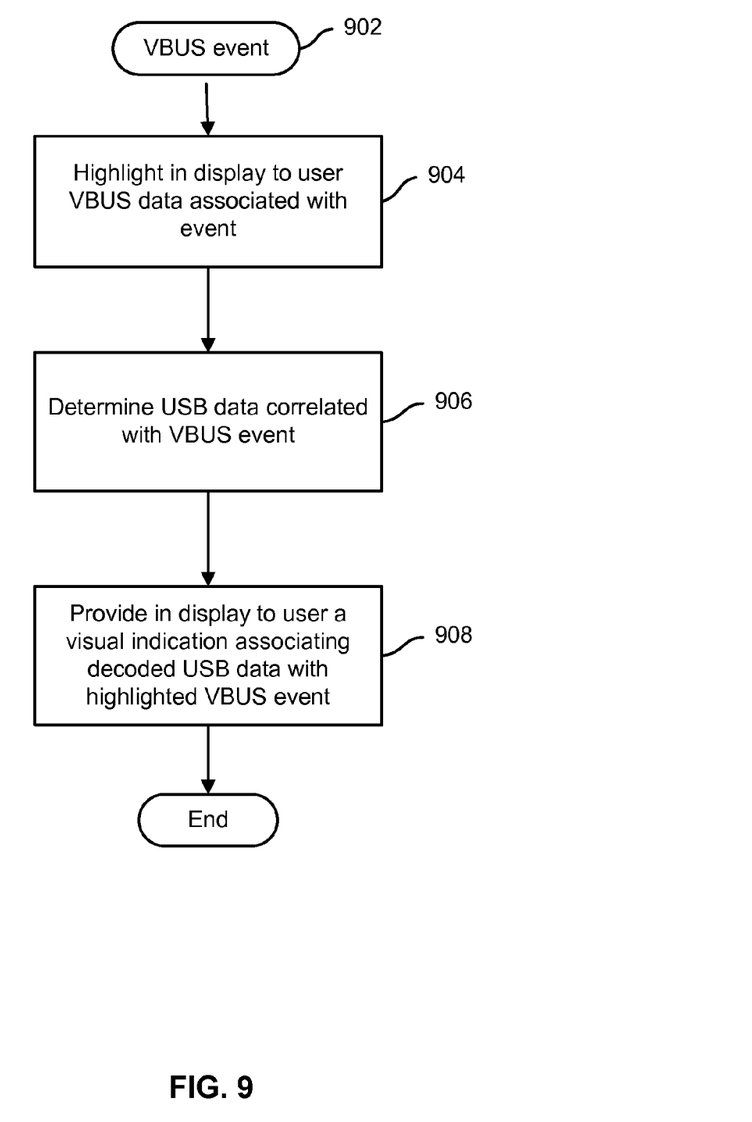
FIG. 9 is a flow diagram illustrating an embodiment of a process for displaying information observed on a monitored bus.

FIG. 9 is a flow diagram illustrating an embodiment of a process for displaying information observed on a monitored bus. In various embodiments, the process of FIG. 9 is implemented on an analysis PC. In the example shown, an indication that a power related event has been detected by the analyzer is received (902). Examples include, without limitation, receiving a token or other data included by the analyzer in an analysis stream received from the analyzer to indicate explicitly that the power related event has been detected, and concluding based on an increase in a rate of samples of power related information being sent by the analyzer that the power related event has been detected. In a display of power related information provided to a user, power related information associated with the event, e.g., current and/or voltage information received after receipt of the token or other indication that the event has been detected, is highlighted as displayed to alert the user that the highlighted data is associated with the event (904). USB data communications associated with the power related event are identified (906). In some embodiments, a bus time associated with the power related event is determined, and packets associated with the same bus time and/or a window following that time, or with a window defined by power event start and end times, are determined to be associated with the power event. In a display to a user of data associated with USB data communications determined to be associated with the power related event, a visual indication, such as highlighting, tagging, marking, etc., is provided to indicate to the user that the displayed information is associated with the power related event (908).

Techniques described herein facilitate the analysis of power related events on a monitored bus without requiring complicated hardware and software configurations, such as using external oscilloscopes and/or logic to observe power related information such as voltage and current at sufficient resolution and/or to trigger USB data capture based on power related events, such as on detection of inrush current. In addition, bandwidth of the connection between the analyzer and the analysis PC is conserved by sending power related samples at a higher resolution rate only when required to provide a higher resolution view of those portions of data likely to be of interest.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of monitoring a bus, comprising:
   detecting at a hardware protocol analyzer that a power related event has occurred on a monitored bus;
   changing a rate at which a power related data is sampled at the hardware protocol analyzer, automatically in response to the power related event being detected; and
   including in an analysis stream transferred to an analysis computer a token or other data indicating that the power related event has been determined to have ended.

2. The method of claim 1, wherein the power related event comprises an inrush current event.

3. The method of claim 1, wherein detecting the power related event comprises monitoring a voltage on a power supply line comprising the monitored bus and generating a detection event in the event an instantaneous voltage differs from an observed average voltage by more than a prescribed amount.

4. The method of claim 1, wherein detecting the power related event comprises monitoring a current on a power supply line comprising the monitored bus, differentiating the observed current over time, and generating a detection event in the event a result of differentiating the current over time exceeds a detection threshold.

5. The method of claim 1, wherein changing the rate at which the power related data is sampled comprises increasing a rate at which power related data values are selected from a stream of observed power related data values.

6. The method of claim 5, wherein the selected samples are transferred to an analysis computer.

7. The method of claim 1, further comprising including in an analysis stream transferred to an analysis computer a token or other data indicating that the power related event has been detected.

8. The method of claim 1, further comprising detecting that the power related event has ended.

9. The method of claim 8, further comprising reverting to a lower sampling rate in response to detecting that the power related event has ended.

10. A method of monitoring a bus, comprising:
    detecting at a hardware protocol analyzer that a power related event has occurred on a monitored bus; and
    triggering, automatically in response to the power related event being detected, a capture of a stream of data packets observed on the monitored bus;
    storing up to a prescribed amount of pre-trigger data observed on the monitored bus in a circular buffer;
    including in an analysis stream sent to an analysis computer, in response to receiving said indication that the power related event has been detected to have occurred, said pre-trigger data stored in the circular buffer; and
    including in the analysis stream sent to the analysis computer a prescribed amount of post-trigger data observed on the monitored bus.

11. The method of claim 10, wherein the power related event comprises an inrush current event.

12. The method of claim 10, wherein the monitored bus comprises a USB bus and the data packets comprise USB data packets.

13. The method of claim 10, further comprising transferring the captured stream of data packets to the analysis computer.

14. A protocol analyzer, comprising:
    a power related event detection circuit configured to detect that a power related event has occurred on a monitored bus;
    a gating logic responsive to a control data received from the power related event detection circuit, provided by the detection circuit in response to the power related event being detected, to change a rate at which samples of power related data observed on the monitored bus are provided; and
    an analysis stream generation logic configured to include a token or other data in an analysis stream of data sent to an analysis computer, the token or other data indicating that the power related event has been determined to have ended.

15. The protocol analyzer of claim 14, wherein the power related event comprises an inrush current event.

16. The protocol analyzer of claim 14, further comprising an analysis stream generation logic configured to insert a power related event detection token in an analysis stream of data sent to an analysis computer.

17. The protocol analyzer of claim 14, wherein the power related event detection circuit is configured to detect that the power related event has occurred on a monitored bus at least in part by monitoring a voltage on a power supply line comprising the monitored bus and generating a detection event in the event an instantaneous voltage differs from an observed average voltage by more than a prescribed amount.

18. The protocol analyzer of claim 14, wherein the power related event detection circuit is configured to detect that the power related event has occurred on a monitored bus at least in part by monitoring a current on a power supply line comprising the monitored bus, differentiating the observed current over time, and generating a detection event in the event a result of differentiating the current over time exceeds a detection threshold.

19. A protocol analyzer, comprising:
    a power related event detection circuit configured to detect that a power related event has occurred on a monitored bus;
    an analysis stream generation logic configured to trigger a capture of USB data on a monitored bus in response to receiving from the power related event detection circuit an indication that the power related event has been detected to have occurred; and
    a circular buffer configured to store up to a prescribed amount of pre-trigger data observed on the monitored bus;
    wherein the analysis stream generation logic is configured to include in an analysis stream sent to the analysis computer, in response to receiving said indication that the power related event has been detected to have occurred, said pre-trigger data stored in the circular buffer;
    wherein the analysis stream generation logic is further configured to include in the analysis stream sent to the analysis computer a prescribed amount of post-trigger data observed on the monitored bus.

20. A computer program product for monitoring a bus, the computer program product being embodied in a computer readable storage medium and comprising computer instructions for:
    detecting at a hardware protocol analyzer that a power related event has occurred on a monitored bus;
    changing a rate at which a power related data is sampled at the hardware protocol analyzer, automatically in response to the power related event being detected;

including in an analysis stream transferred to an analysis computer a token or other data indicating that the power related event has been determined to have ended.

21. A computer, comprising:
a communication interface configured to receive from a USB protocol analyzer an analysis stream comprising data observed by the USB protocol analyzer on a monitored bus; and
a processor coupled to the communication interface and configured to process the analysis stream, including by:
receiving in the analysis stream a token or other data indicating that a power related event has been detected on the monitored bus by the USB protocol analyzer,
wherein a rate at which a power related data is sampled at the USB protocol analyzer is changed automatically in response to the power related event being detected; and
receiving in the analysis stream a token or other data indicating that the power related event has been determined by the USB protocol analyzer to have ended.

22. The computer of claim 21, wherein the processor is further configured to process the analysis stream by:
highlighting in a display of information determined by decoding data comprising the analysis stream a portion of said information that has been determined by the processor to be associated with the power related event based at least in part on the token or other data included in the analysis stream by the USB protocol analyzer.

23. The computer of claim 21, wherein highlighting said portion of said information that has been determined by the processor to be associated with the power related event includes highlighting a portion of a display of information observed on a power supply line comprising the monitored bus.

24. The computer of claim 21, wherein highlighting said portion of said information that has been determined by the processor to be associated with the power related event includes highlighting a portion of a display of information determined by decoding USB packets observed on the monitored bus.

25. A method of monitoring a bus, comprising:
detecting at a hardware protocol analyzer that a power related event has occurred on a monitored bus;
changing a rate at which a power related data is sampled at the hardware protocol analyzer, automatically in response to the power related event being detected;
detecting that the power related event has ended; and
reverting to a lower sampling rate in response to detecting that the power related event has ended.

26. A protocol analyzer, comprising:
a power related event detection circuit configured to detect that a power related event has occurred on a monitored bus; and
a gating logic responsive to a first set of control data received from the power related event detection circuit, provided by the detection circuit in response to the power related event being detected, to change a rate at which samples of power related data observed on the monitored bus are provided;
wherein the power related event detection circuit is further configured to detect that the power related event has ended; and
wherein the gating logic is responsive to a second set of control data received from the power related event detection circuit, provided by the detection circuit in response to the detection that the power related event has ended, to revert to a lower sampling rate.

27. A computer program product for monitoring a bus, the computer program product being embodied in a computer readable storage medium and comprising computer instructions for:
detecting at a hardware protocol analyzer that a power related event has occurred on a monitored bus; and
triggering, automatically in response to the power related event being detected, a capture of a stream of data packets observed on the monitored bus;
storing up to a prescribed amount of pre-trigger data observed on the monitored bus in a circular buffer;
including in an analysis stream sent to an analysis computer, in response to receiving said indication that the power related event has been detected to have occurred, said pre-trigger data stored in the circular buffer; and
including in the analysis stream sent to the analysis computer a prescribed amount of post-trigger data observed on the monitored bus.

* * * * *